United States Patent Office 3,111,457
Patented Nov. 19, 1963

3,111,457
ANTHELMINTIC COMPOSITION AND METHOD OF USING SAME
James C. Trace and George T. Edds, Webster, Iowa, assignors to American Home Products Corporation, New York, N.Y., a corporation of Delaware
No Drawing. Filed Jan. 30, 1962, Ser. No. 169,941
11 Claims. (Cl. 167—53)

This invention relates to anthelmintic compositions which are effective in, and capable of being used for, removing internal parasites from animals.

Our invention is also directed to a method of treating animals in order to remove internal parasites therefrom, which method utilizes the novel anthelmintic compositions as the active treatment agent. These compositions are especially useful in the removal of internal parasites such as strongyles from various animals, such as horses, which are infested therewith.

The fundamental problem in the therapeutic control of animal parasites is to find and properly use drugs which are more toxic to the parasites than to their hosts. Since the protoplasm of the parasite in many respects is not far different from that of its host, it is difficult to find drugs which are toxic to the parasite and not to its host. This invention is concerned with an anthelmintic composition which contains an agent to retard absorption of the organophosphate parasiticidal agent, thus rendering the composition less toxic to the host animal being treated, without affecting, adversely, the anthelmintic activity of the composition on the parasites.

The organic phosphates, originally used as agricultural chemicals, possess outstanding value as insecticides. Unfortunately they are generally so toxic that they cannot be administered internally for the purpose of removing internal parasites without, at the same time, causing serious damage to the host.

Our invention is concerned with an anthelmintic composition suitable for oral use in single or repeated doses in the treatment of animals such as horses, dogs, etc., which composition contains one of these organic phosphates as the active agent. The composition is especially formulated in order to secure optimum efficacy in parasite removal, this desired result, however, being secured with complete safety to the host animal being treated.

One of the organic phosphate chemicals which has previously been used as an agricultural chemical, principally as a fly bait, and which has been topically applied against parasites, is the organic phosphate known as Bayer L13/59. It is also known as "Dylox," "Dipterex," or "Dyrex." This compound, which is described and claimed in Lorenz Patent No. 2,701,225, is a phosphonic ester having marked toxic properties. The compound may be represented by the formula

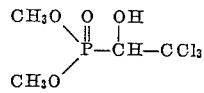

Chemically it may be referred to as $\beta,\beta,\beta$-trichloro-$\alpha$-hydroxyethyl-phosphonic dimethyl ester. Using a different system of nomenclature this compound may also be named O,O - dimethyl - 2,2,2 - trichloro - 1 - hydroxyethylphosphonate. It is this latter term which will be used herein in describing the active toxic organic phosphate, utilized as active agent in our anthelmintic composition.

While organic phosphate compounds, including O,O-dimethyl - 2,2,2 - trichloro - 1 - hydroxyethylphosphonate, have previously been considered as of possible value in veterinary parasiticidal compositions, the organophosphates are so highly toxic that the use of O,O-dimethyl-2,2,2-trichloro-1-hydroxyethylphosphonate for this purpose had not been considered practical. The administration of O,O - dimethyl - 2,2,2 - trichloro - 1 - hydroxyethylphosphonate to animals, either orally, or by injection, for the purpose of removing parasites therefrom, has resulted in extreme toxic manifestations to the animal, especially when the organic phosphate is administered in the heavy dosages which are normally required to secure effective parasite removal.

Reducing the toxicity of O,O-dimethyl-2,2,2-trichloro-1-hydroxyethylphosphonate in its effect on the host animal, without interference with its parasiticidal action, has previously been secured by the simultaneous, or by the substantially simultaneous, administration of atropine along with the organophosphate drug. In practice this procedure has given very satisfactory results for some animals and for some parasites. However atropine, when given orally to horses, at least when administered as a suspension, has been found unsatisfactory.

To provide anthelmintic compositions containing this organophosphate as the active agent, which compositions can, however, be safely use for the effective removal of parasites without danger of toxicity to the host animal, is therefore the primary aim of this invention. The compositions with which this invention is concerned are absorbed to a degree sufficient to secure a high kill of internal parasites, which absorption is not always secured when the organophosphate active agent is administered along with atropine or one of the salts of atropine.

We have found that when O,O-dimethyl-2,2,2-trichloro-1-hydroxyethylphosphate is orally administered to an animal in any dosage form, such as, for example, in a pill or bolus, or as granules, along with hydrated alumina (aluminum hydroxide) the toxic manifestations of the organic phosphonate are greatly reduced if, in fact, they are not entirely eliminated. At the same time, the activity of the O,O-dimethyl-2,2,2-trichloro-1-hydroxyethyl-phosphonate for the removal of parasites from the animals is not interfered with and is, in fact, somewhat enhanced.

While O,O - dimethyl - 2,2,2 - trichloro - 1 - hydroxyethylphosphonate has previously been found effective in the removal of bots in horses, the optimum and safe dosage of the organic phosphate for bots is only 40 milligrams of the drug per kilogram of body weight. At such a low dosage it is virtually ineffective against other, and more important, parasites in the horse, particularly the strongyles. When attempts are made to administer the organic phosphate to horses at dosages which would be effective in the removal of strongyles, for example, at dosages of 80 milligrams per kilogram of body weight, or higher, colic and diarrhea frequently occur. Moreover, less than one-half of the strongyles present in the animal are usually removed under these conditions.

In its broadest aspect, therefore, our invention involves the simultaneous oral administration, or substantially simultaneously oral administration, to an animal being treated of O,O-dimethyl-2,2,2-trichloro-1-hydroxyethylphosphonate and powdered hydrated alumina. Perhaps the simplest way of accomplishing this is to place the O,O - dimethyl - 2,2,2 - trichloro-1-hydroxyethylphosphonate and the hydrated alumina in a single dosage form, such as in a bolus or pill, but this is not necessarily the only way that the two ingredients can be simultaneously administered.

Our invention, in one embodiment thereof, is therefore directed to a special formulation of O,O-dimethyl-2,2,2-trichloro-1-hydroxyethylphosphonate as the active agent, which formulation includes aluminum hydroxide as excipient. Absorption of the organic phosphate is retarded by the presence of the hydrated alumina powder, thus resulting in the retention of a higher percentage of the drug within the gut of the host animal and reduced toxicity thereto.

In securing these desirable results we have found that about one part of aluminum hydroxide may be combined with from about 2 parts to about 14 parts of the active organophosphate ingredient, these parts being by weight, in the oral administration form of our anthelmintic composition.

Our invention is therefore directed to an anthelmintic composition for the treatment of animals infested with parasites, which composition is formulated with hydrated alumina powder so as to secure optimum efficacy and safety to the host animal. While aluminum hydroxide has previously been used as a tablet excipient, the enhanced efficacy of the O,O-dimethyl-2,2,2-trichloro-1-hydroxyethylphosphonate active agent, accompanied by reduced toxicity, when the preparation also contains hydrated alumina was not to be expected. It is a discovery of outstanding importance in the field of veterinary preparations.

That the administration, simultaneously, of aluminum hydroxide, along with O,O-dimethyl-2,2,2-trichloro-1-hydroxyethylphosphonate, results in fewer objectionable side effects than are frequently experienced when atropine is administered simultaneously with the organic phosphonate is shown by the results summarized in the following table. These results were obtained in comparative tests using dogs as the animal treated, administering orally 75 milligrams of the organic phosphate per kilogram of body weight of the animal.

Table 1

| Trial | Aluminum hydroxide (if administered) | Atropine Sulfate (if administered) | Number of dogs | Side effects |
| --- | --- | --- | --- | --- |
| 1 | Yes; 1.0 part to 4.3 of drug. | | 3 | None. |
| 2 | | Yes; 1.0 part to 150 parts of drug. | 4 | Very slight. |
| 3 | | | 5 | Moderate to severe. |

By side effects are meant salivation, tremors, ataxia, nausea, or vomition, all toxic manifestations in the treated animals.

The efficacy of the treatment when hydrated alumina powder is present along with the O,O-dimethyl-2,2,2-trichloro-1-hydroxyethylphosphonate is shown by the results in the following table. Efficacy, in each instance, was based on strongyle egg count reduction per gram of animal feces after treatment, or in removal of strongyles in the feces. The animals treated were horses, and toxicity included colic (severe intestinal discomfort or cramps) and/or profuse diarrhea. In each case the "Dosage" is indicated in milligram of O,O-dimethyl-2,2,2-trichloro-1-hydroxyethylphosphonate per kilogram of body weight.

Table 2

| Dosage, mg./kg. | Formulation | No. of Horses | Efficacy vs. Strongyles, percent | Toxicity |
| --- | --- | --- | --- | --- |
| 25-40 | Technical "Dylox" Powder (No Aluminum hydroxide). | 16 | 2 | No. |
| 80 | do | 3 | 46 | Yes. |
| 80 | "Dylox" Powder Administered along with Aluminum hydroxide. | 80 | 86 | No. |
| 240-320 | do | 5 | (¹) | No. |

¹ Not determined.

In accordance with our invention, the ratio of the organic phosphonate, O,O-dimethyl-2,2,2-trichloro-1-hydroxyethylphosphonate, to the hydrated alumina in the preparation orally administered to the animal being treated may vary within considerable limits. Thus, on a weight-to-weight basis, the ratio of "Dylox" to hydrated alumina may vary from 2.50 to 1 to as high as 13.5 to 1, or even higher.

Good results have been obtained with compositions having the following weight ratios of O,O-dimethyl-2,2,2-trichloro-1-hydroxyethylphosphonate to aluminum hydroxide:

2.58 to 1
3.11 to 1
5.45 to 1
and 13.37 to 1

A formula suitable for preparing a product suitable for the treatment of animals having 500 lbs. of body weight is as follows.

Table 3

| Ingredient: | Amount, grams |
| --- | --- |
| O,O-dimethyl-2,2,2-trichloro-1-hydroxyethylphosphonate | 18.20 |
| Hydrated alumina powder | 4.17 |
| Pharmaceutical glaze (shellac) | 1.29 |

This formulation is used in preparing boluses or pills each of 23.66 grams, each being individually coated with the pharmaceutical glaze. The ratio of O,O-dimethyl-2,2,2-trichloro-1-hydroxyethylphosphonate to hydrated alumina, on a weight basis, in the products prepared in accordance with this formulation is 4.36 to 1.

Boluses of the type described are administered orally, most easily with a balling gun. However, in some instances, they may be also administered to the animal by hand.

As another mode of administration, the boluses may also be crushed into "granules" and orally fed to the horse at one-half dosage rate, for example at a dosage of 40 milligrams of active material per kilogram of horse body weight. The crushed material may be supplied in the animal's feed daily at about the indicated dosage for five consecutive days. Excellent results in the removal of parasites have been secured with this procedure.

The boluses may also be administered orally, with good results, to animals such as dogs and ruminant animals at, for example, a dosage of 75–150 milligrams of active material per kilogram of body weight.

In the treatment of horses, when the full dosage of the active organophosphate is supplied, frequently only a single administration is necessary in order to secure the desired results. However in some instances, and also in the treatment of animals other than horses, repeated oral dosages may be advantageous, these oral administrations being repeated on consecutive days on a daily treatment basis.

We claim:
1. The method of treating animals to remove helminths therefrom which comprises orally administering to said animals, substantially simultaneously, O,O-dimethyl-2,2,2-trichloro-1-hydroxyethylphosphonate and aluminum hydroxide.

2. The method of treating animals in order to remove helminths therefrom which comprises administering to said animals an anthelmintic composition comprising O,O-dimethyl-2,2,2-trichloro-1-hydroxyethylphosphonate and aluminum hydroxide, said composition being administered orally at a dosage of from 40 milligrams to 150 milligrams of O,O-dimethyl-2,2,2-trichloro-1-hydroxyethylphosphonate per kilogram of animal body weight.

3. The method defined in claim 2 wherein said dosage is a daily dosage, and said composition is administered on successive days.

4. The method of treating horses in order to remove helminths therefrom which comprises orally administering to said horses a composition comprising aluminum hydroxide and O,O-dimethyl-2,2,2-trichloro-1-hydroxyethylphosphonate.

5. The method defined in claim 4 wherein said composition is administered in a daily dosage equivalent to 40 milligrams of O,O-dimethyl-2,2,2-trichloro-1-hydroxyethylphosphonate per kilogram of horse body weight.

6. The method defined in claim 4 wherein said composition is administered upon successive days for up to five days.

7. An anthelmintic composition which comprises O,O-dimethyl-2,2,2-trichloro-1-hydroxyethylphosphonate and aluminum hydroxide.

8. An anthelmintic composition for oral administration to animals which comprises O,O-dimethyl-2,2,2-trichloro-1-hydroxyethylphosphonate and aluminum hydroxide, there being present in said composition, by weight, approximately 1 part of aluminum hydroxide per from 2 parts to 14 parts of O,O-dimethyl-2,2,2-trichloro-1-hydroxyethylphosphonate.

9. A bolus for oral administration to animals for the purpose of eliminating internal parasites therefrom which comprises O,O-dimethyl-2,2,2-trichloro-1-hydroxyethylphosphonate and aluminum hydroxide.

10. An anthelmintic composition suitable for oral administration to animals which comprises O,O-dimethyl-2,2,2-trichloro-1-hydroxyethylphosphonate and aluminum hydroxide, the ratio of O,O-dimethyl-2,2,2-trichloro-1-hydroxyethylphosphonate to aluminum hydroxide in said composition, on a weight-to-weight basis, ranging from approximately 2.50 to 1 to 13.5 to 1.

11. An anthelmintic composition comprising O,O-dimethyl-2,2,2-trichloro-1-hydroxyethylphosphonate and aluminum hydroxide in single dosage form, the ratio on a weight basis of O,O-dimethyl-2,2,2-trichloro-1-hydroxyethylphosphonate to aluminum hydroxide being approximately 4.36 to 1.

References Cited in the file of this patent

Grote: J. Am. Pharm. Ass'n, vol. 42, 1953, pages 319 and 320.

Levin: Am. J. Vet. Research, vol. 29, 1958, pages 299 to 303.